United States Patent
Lee

(10) Patent No.: US 9,025,050 B2
(45) Date of Patent: May 5, 2015

(54) DIGITAL PHOTOGRAPHING APPARATUS AND CONTROL METHOD THEREOF

(75) Inventor: Jae-sun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 13/268,171

(22) Filed: Oct. 7, 2011

(65) Prior Publication Data

US 2012/0162478 A1    Jun. 28, 2012

(30) Foreign Application Priority Data

Dec. 22, 2010   (KR) ........................ 10-2010-0132822

(51) Int. Cl.
     H04N 5/262     (2006.01)
     H04N 9/73     (2006.01)
     G06K 9/00     (2006.01)
     H04N 5/232     (2006.01)
     H04N 5/235     (2006.01)
     H04N 9/64     (2006.01)

(52) U.S. Cl.
CPC ....... *H04N 5/23219* (2013.01); *H04N 5/23229* (2013.01); *H04N 5/2351* (2013.01); *H04N 9/643* (2013.01)

(58) Field of Classification Search
USPC .............................. 348/223.1, 222.1; 382/118
See application file for complete search history.

(56) References Cited

U.S. PATENT DOCUMENTS

| | | | |
|---|---|---|---|
| 2002/0081003 A1* | 6/2002 | Sobol | 382/118 |
| 2007/0262985 A1* | 11/2007 | Watanabe et al. | 345/420 |
| 2008/0219217 A1* | 9/2008 | Kim et al. | 370/331 |
| 2008/0219517 A1* | 9/2008 | Blonk et al. | 382/118 |
| 2009/0073275 A1* | 3/2009 | Awazu | 348/222.1 |
| 2011/0032228 A1* | 2/2011 | Ho | 345/207 |

* cited by examiner

*Primary Examiner* — Twyler Haskins
*Assistant Examiner* — Carramah J Quiett
(74) *Attorney, Agent, or Firm* — Drinker Biddle & Reath LLP

(57) ABSTRACT

A digital photographing apparatus for providing natural images fitting a surrounding environment or brightness to a user by automatically determining an image processing type and an image processing strength according to the surrounding brightness and a control method thereof.

20 Claims, 7 Drawing Sheets

DIGITAL PHOTOGRAPHING APPARATUS AND CONTROL METHOD THEREOF

CROSS-REFERENCE TO RELATED PATENT APPLICATION

This application claims the benefit of Korean Patent Application No. 10-2010-0132822, filed on Dec. 22, 2010, in the Korean Intellectual Property Office, the entire disclosure of which is incorporated herein by reference.

BACKGROUND

1. Field of the Invention

The invention generally relates to a digital photographing apparatus and a control method thereof, where a captured image is processed according to the measured surrounding brightness.

2. Description of the Related Art

Users of digital cameras often transfer captured images to a Personal Computer (PC) and edit the pictures using an image editing program, such as Photoshop™. The users may be inconvenienced by having to transfer the picture to the computer to edit the picture, and the user may lose the opportunity to capture additional pictures of the same subject because the user may not know whether the user should capture additional pictures because the picture is not good enough.

SUMMARY

Therefore, there is a need in the art for a digital photographing apparatus, a method of controlling a digital photographing apparatus, and a computer readable medium encoded with the method thereon, the method of controlling a digital photographing apparatus including: measuring surrounding brightness of the digital photographing apparatus; setting at least one of an image processing type and an image processing strength according to the measured surrounding brightness; and performing image processing of an input image according to at least one of the set image processing type and the set image processing strength.

The measuring of the surrounding brightness may include measuring the surrounding brightness by calculating a luminance value of an input image captured by an image sensor of the digital photographing apparatus.

The measuring of the surrounding brightness may include measuring the surrounding brightness through a photo sensor of the digital photographing apparatus.

The measuring of the surrounding brightness may include measuring the surrounding brightness through a Liquid Crystal Display (LCD) backlight unit of the digital photographing apparatus.

The setting may include variously setting the image processing strength according to a luminance value of the surrounding brightness.

The setting may include: detecting a first area including a face area from the input image; dividing an entire area of the input image into the detected first area and a second area remaining by excluding the first area from the input image; calculating a difference between a luminance value of the first area corresponding to the measured surrounding brightness and a luminance value of the second area; and if the difference is less than a first threshold, setting at least one of first image processing including face tone processing of the first area and a strength of the first image processing.

The setting may include: detecting a first area including a face area from the input image; calculating a standard deviation of luminance values of pixels existing in the first area, which corresponds to the measured surrounding brightness; and setting at least one of second image processing including face retouch processing of the first area according to the calculated standard deviation and a strength of the second image processing.

The setting may include: detecting a first area including a face area from the input image; dividing an entire area of the input image into the detected first area and a second area remaining by excluding the first area from the input image; calculating a difference between a luminance value of the first area corresponding to the measured surrounding brightness and a luminance value of the second area; calculating a standard deviation of luminance values of pixels existing in the first area, which corresponds to the measured surrounding brightness; and setting at least one of the image processing type and the image processing strength based on the calculated difference and the calculated standard deviation.

The setting may include: dividing an input image captured by an image sensor into N unit areas (N is a positive integer); calculating mean values of a plurality of R pixels, a plurality of G pixels, and plurality of B pixels in a unit area; calculating a luminance value of the unit area by using the mean values; and calculating a luminance value according to the surrounding brightness by summing luminance values of the N unit areas and dividing the summed luminance value by N.

The setting may include setting the image processing strength as a first image processing strength if a luminance value according to the measured surrounding brightness is less than the first threshold, setting the image processing strength as a second image processing strength if the luminance value is equal to or greater than the first threshold and less than a second threshold, and setting the image processing strength as a third image processing strength if the luminance value is equal to or greater than the second threshold.

The method may further include displaying an image image-processed according to at least one of the set image processing type and the set image processing strength on a first area of a display screen of the digital photographing apparatus.

The method may further include displaying an image image-processed according to a user image processing setup on a second area of the display screen.

According to another aspect of the invention, there is provided a digital photographing apparatus including: a measurement unit for measuring surrounding brightness; a luminance detector for detecting a luminance corresponding to the measured surrounding brightness; and a digital signal processor for setting at least one of an image processing type and an image processing strength according to the measured surrounding brightness and performing image processing of an input image according to at least one of the set image processing type and the set image processing strength.

The measurement unit may include an image sensor of the digital photographing apparatus, and the luminance detector may divide an input image captured by the image sensor into N unit areas (N is a positive integer), calculate mean values of a plurality of R pixels, a plurality of G pixels, and plurality of B pixels in a unit area, calculate a luminance value of the unit area by using the mean values, and calculate a luminance value according to the surrounding brightness by summing luminance values of the N unit areas and dividing the summed luminance value by N.

The digital signal processor may include: a setup unit for variously setting at least one of the image processing type and the image processing strength according to the luminance value of the surrounding brightness; and an image processor for performing image processing of the input image according to at least one of the set image processing type and the set image processing strength.

The digital signal processor may include: a face area detector for detecting a first area including a face area from the input image; an area divider for dividing an entire area of the input image into the detected first area and a second area remaining by excluding the first area from the input image; a luminance difference value calculator for calculating a difference between a luminance value of the first area corresponding to the measured surrounding brightness and a luminance value of the second area; and an image processing setup unit for setting at least one of first image processing including face tone processing of the first area and a strength of the first image processing if the difference is less than a first threshold.

The digital signal processor may include: a face area detector for detecting a first area including a face area from the input image; a standard deviation calculator for calculating a standard deviation of luminance values of pixels existing in the first area, which corresponds to the measured surrounding brightness; and an image processing setup unit for setting at least one of second image processing including face retouch processing of the first area according to the calculated standard deviation and a strength of the second image processing.

The digital signal processor may include: a face area detector for detecting a first area including a face area from the input image; an area divider for dividing an entire area of the input image into the detected first area and a second area remaining by excluding the first area from the input image; a luminance difference value calculator for calculating a difference between a luminance value of the first area corresponding to the measured surrounding brightness and a luminance value of the second area; a standard deviation calculator for calculating a standard deviation of luminance values of pixels existing in the first area, which corresponds to the measured surrounding brightness; and an image processing setup unit for setting at least one of the image processing type and the image processing strength based on the calculated difference and the calculated standard deviation.

The digital signal processor may set the image processing strength as a first image processing strength if a luminance value according to the measured surrounding brightness is less than the first threshold, set the image processing strength as a second image processing strength if the luminance value is equal to or greater than the first threshold and less than a second threshold, and set the image processing strength as a third image processing strength if the luminance value is equal to or greater than the second threshold.

According to another aspect of the invention, there is provided a non-transitory computer-readable recording medium storing a computer-readable program for executing the method of controlling a digital photographing apparatus.

The method of controlling a digital photographing apparatus according to an exemplary embodiment of the invention may provide natural images fitting a surrounding environment or brightness to a user by automatically determining an image processing type and an image processing strength according to the surrounding brightness.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
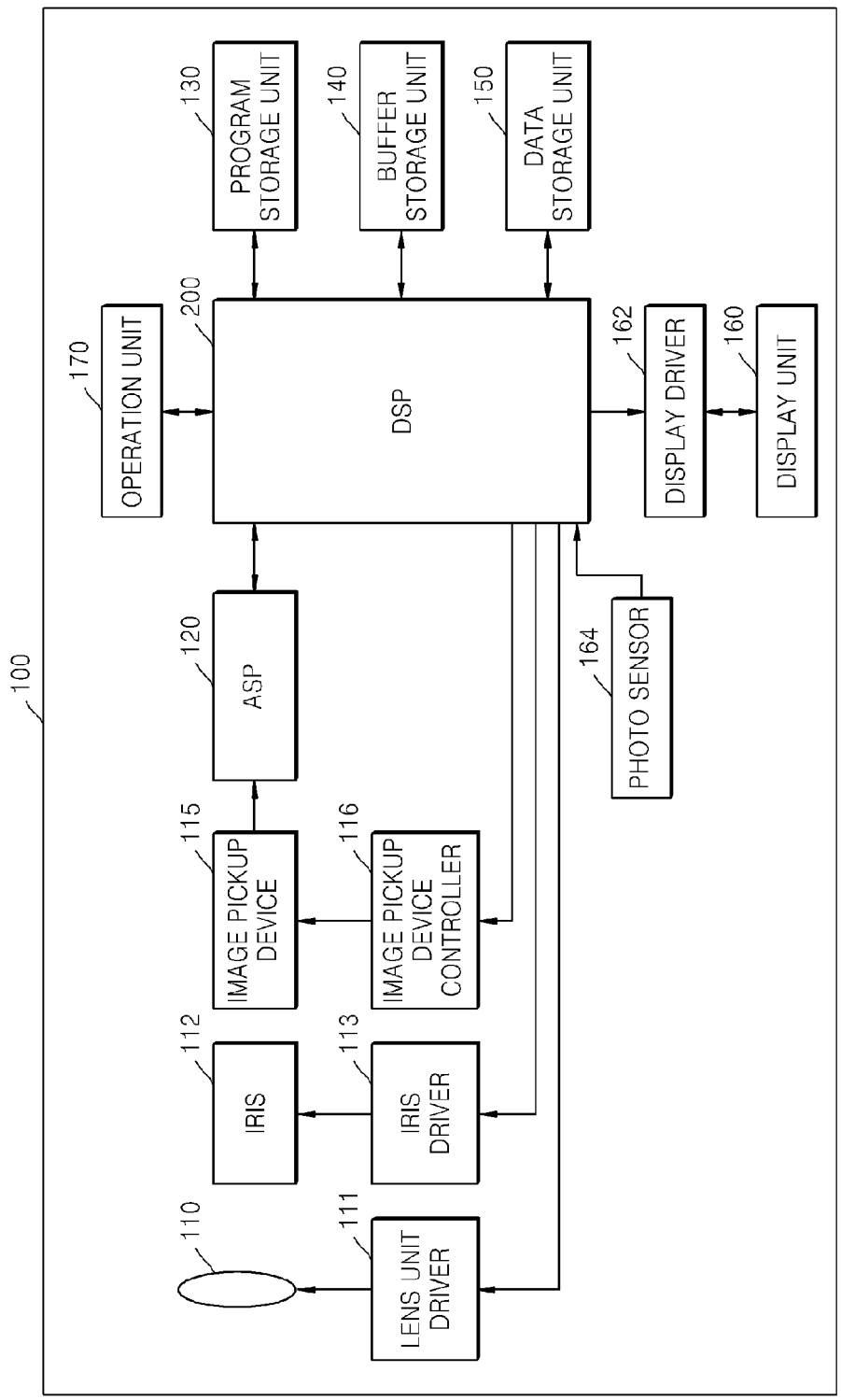
FIG. 1 is a block diagram of a digital photographing apparatus according to an exemplary embodiment of the invention.

The invention will now be described more fully with reference to the accompanying drawings, in which exemplary embodiments of the inventive concept are shown. Like reference numerals in the drawings denote like elements, and thus their repetitive description will be omitted.

FIG. 1 is a block diagram of a digital photographing apparatus according to an exemplary embodiment of the invention.

A digital camera 100 is described as an example of the digital photographing apparatus. However, the digital photographing apparatus is not limited to FIG. 1 and may also be applicable to digital devices, such as a camera phone, a Personal Digital Assistant (PDA), and a Portable Multimedia Player (PMP).

The digital camera 100 according to an exemplary embodiment of the invention may include a lens unit 110, a lens unit driver 111, an iris 112, an iris driver 113, an image pickup device 115, an image pickup device controller 116, an analog signal processor (ASP) 120, a program storage unit 130, a buffer storage unit 140, a data storage unit 150, a display driver 162, a display unit 160, a digital signal processor (DSP) 200, and an operation unit 170. Here, the lens unit 110, the lens unit driver 111, the iris 112, the iris driver 113, the image pickup device 115, the image pickup device controller 116, and the ASP 120 may be referred to as an image pickup unit.

The lens unit 110 concentrates an optical signal. The lens unit 110 may include a zoom lens for controlling an angle of view to be narrow or wide according to a focal length and a focus lens for focusing a subject. The zoom lens and the focus lens may be constructed as a single lens or a group of a plurality of lenses.

The iris 112 adjusts light intensity of incident light by adjusting an open/close grade thereof.

The lens unit driver 111 and the iris driver 113 receive a control signal from the DSP 200 and drive the lens unit 110 and the iris 112, respectively. The lens unit driver 111 adjusts a focal length by adjusting a position of the lens unit 110 and performs an operation, such as auto-focusing, zooming, or focus changing. The iris driver 113 adjusts an open/close grade of the iris 112, and in particular, performs an operation, such as auto-focusing, automatic exposure compensation, focus changing, or adjustment of depth of field, by adjusting an f-number or an iris value.

The optical signal transmitted through the lens unit 110 reaches the image pickup device 115 to form an image of a subject on a light receiving surface of the image pickup device 115. The image pickup device 115 may use a Charge-Coupled Device (CCD), a Complementary Metal-Oxide Semiconductor Image Sensor (CIS), or a high-speed image sensor for converting the optical signal to an electrical signal. Sensitivity of the image pickup device 115 may be controlled by the image pickup device controller 116. The image pickup device controller 116 may control the image pickup device 115 according to a control signal automatically generated by an image signal input in real-time or a control signal manually input by an operation of a user. According to an exemplary embodiment of the invention, the electrical signal accumulated through the image pickup device 115 or the input image signal is output to the DSP 200, and the DSP 200 calculates a luminance value corresponding to a surrounding brightness by using the image signal output through the image pickup device 115. The calculation of the luminance value will be described later with reference to FIG. 3.

A photo sensor 164 measures a surrounding brightness of the digital camera 100 and outputs a measured sensor value to the DSP 200, and the DSP 200 calculates a luminance value corresponding to the surrounding brightness from the sensor value.

The surrounding brightness may also be sensed through light scanned through a backlight unit (not shown) of the display unit 160.

Although the surrounding brightness is sensed through the image pickup device 115, the photo sensor 164, or the backlight unit in an exemplary embodiment of the invention, the invention is not limited thereto, and the surrounding brightness may be sensed through other sensors. In addition, although components for measuring the surrounding brightness are shown together in FIG. 1, it should be understood that the components are selectively used.

A light-exposure time of the image pickup device 115 is adjusted by a shutter (not shown). The shutter includes a mechanical shutter for adjusting incident light by moving a cover and an electronic shutter for controlling light-exposure by providing an electrical signal to the image pickup device 115.

The ASP 120 performs noise reduction processing, gain adjustment, waveform standardization, analog-to-digital conversion of an analog signal provided from the image pickup device 115.

Through the operation unit 170, a control signal can be input by the user from the outside. The operation unit 170 may include various functional buttons, such as a shutter-release button for inputting a shutter-release signal to take a picture by exposing the image pickup device 115 to light for a predetermined time, a power button for inputting a control signal to control ON/OFF of power, a wide-angle zoom button and a telescopic zoom button for respectively widening an angle of view and narrowing the angle of view, a mode selection button for selecting a character input mode, a photographing mode, and a reproduction mode, a white balance setup function selection button, and an exposure setup function selection button. In addition, according to an exemplary embodiment of the invention, the user may select an automatic image processing mode through the operation unit 170. Here, the automatic image processing mode means a mode of automatically setting an image processing type or an image processing strength according to a surrounding brightness and processing an image based on the set image processing type or strength instead of manually setting the image processing type or strength by the user. Although the operation unit 170 may have the various functional buttons, the operation unit 170 is not limited thereto, and the operation unit 170 may be implemented by any type of keyboard, touch pad, touch screen, and remote control only if the user can input a signal therethrough.

The digital camera 100 includes the program storage unit 130 for storing programs, such as an operating system and an application system for driving the digital camera 100, the buffer storage unit 140 for temporarily storing data required to perform a computation or result data, and the data storage unit 150 for storing an image file including an image signal and various kinds of information required for the programs.

The digital camera 100 includes the display unit 160 for displaying an operation state of the digital camera 100 and information regarding an image captured by the digital camera 100. The display unit 160 may provide visual information and auditory information to the user. To provide the visual information, the display unit 160 may include, for example, a Liquid Crystal Display (LCD) panel, or an Organic Light Emitting Diode (OLED) panel. The display driver 162 provides a driving signal to the display unit 160.

The digital camera 100 includes the DSP 200 for processing an input image signal and controlling corresponding components of the digital camera 100 according to an input signal from the outside. The DSP 200 may reduce noise of input image data and perform image signal processing for image quality enhancement, such as gamma correction, color filter array interpolation, color matrix, color correction, and color enhancement. In addition, the DSP 200 may generate an image file by compressing image data generated through image signal processing for image quality enhancement or restore the image data from the image file. A compression format of an image may be a reversible format or an irreversible format. Examples of a proper format are a Joint Photographic Experts Group (JPEG) format and a JPEG 2000 format. The compressed data may be stored in the data storage unit 150. In addition, the DSP 200 may perform functional processing, such as clear processing, color processing, blur processing, edge emphasis processing, image analysis processing, image recognition processing, and image effect processing. The image recognition processing may include face recognition processing and scene recognition processing. For example, brightness level adjustment, color correction, contrast adjustment, contour emphasis adjustment, screen division processing, creation of a character image, and image composition processing may be performed.

In addition, the DSP 200 may generate control signals for controlling Auto Focusing (AF), a zoom change, a focus change, and Auto Exposure (AE) correction by executing programs stored in the program storage unit 130 or using a separate module, respectively provide the control signals to the lens unit driver 111, the iris driver 113, and the image pickup device controller 116, and generally control operations of components, such as a shutter ad a flash, in the digital camera 100.

Figure 2:
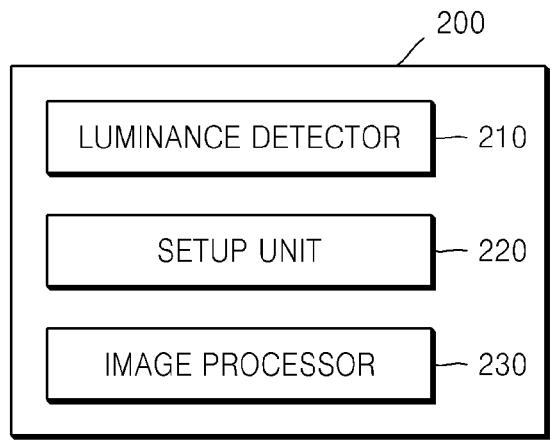
FIG. 2 is a block diagram of a digital signal processor shown in FIG. 1.

FIG. 2 is a block diagram of the DSP 200 shown in FIG. 1.

Referring to FIG. 2, the DSP 200 includes a luminance detector 210, a setup unit 220, and an image processor 230.

The luminance detector 210 detects a luminance corresponding to a surrounding brightness measured by using image information or sensing values input from a measurement unit, such as the image pickup device 115 or the photo sensor 164, for measuring the surrounding brightness, which is shown in FIG. 1.

An electrical signal or electric charge (referred to as an input image signal) picked up by the image pickup device 115 is accumulated to an R pixel, a G pixel, and a B pixel. According to an exemplary embodiment of the invention, the surrounding brightness is measured by using charge quantity accumulated to the R pixel, the G pixel, and the B pixel.

In detail, if it is assumed that a light-reception area or a predetermined area, e.g., 105×36 (horizontal×vertical), of the image pickup device 115 is a basic cell area, a luminance value Y is calculated on a unit area (referred to as a patch) basis by grouping the basic cell area into 14×10. Here, each patch includes a sum of R pixels, a sum of G pixels, and a sum of B pixels, and thus the sum of R pixels, the sum of G pixels, and the sum of B pixels may be calculated for each patch. Therefore, mean values of R, G, and B pixels per patch may be obtained by dividing the sum of R pixels, the sum of G pixels, and the sum of B pixels by the number of R pixels, the number of G pixels, and the number of B pixels, respectively.

Accordingly, a luminance value per patch is calculated by Equation 1.

$$Y = 0.3 \times (\text{mean value of } R \text{ pixels}) + 0.6 \times (\text{mean value of } G \text{ pixels}) + 0.1 \times (\text{mean value of } B \text{ pixels}). \quad \text{Equation (1)}$$

A luminance value of an entire area is calculated by Equation 2 by using the luminance value per patch.

$$\text{Luminance of entire image} = \text{sum of luminance values of patches/the number of patches.} \quad \text{Equation (2)}$$

The setup unit 220 sets an image processing type and/or an image processing strength according to the measured surrounding brightness. Here, the image processing type includes face tone processing and face retouch processing. The face tone processing means color processing to show a facial skin color shown too dark as an actual skin color, and the face retouch processing means processing to remove blemishes and wrinkles existing on a face. The image processing strength means a processing strength according to the image processing type, in which strength and weakness of an image are adjusted by classifying the image processing strength into a first stage, a second stage, and a third stage. Although the two image processing types and the 3 stages of the image processing strength are described in the current embodiment, the invention is not limited thereto. A detailed configuration of the setup unit 220 is described with reference to FIG. 3.

Figure 3:
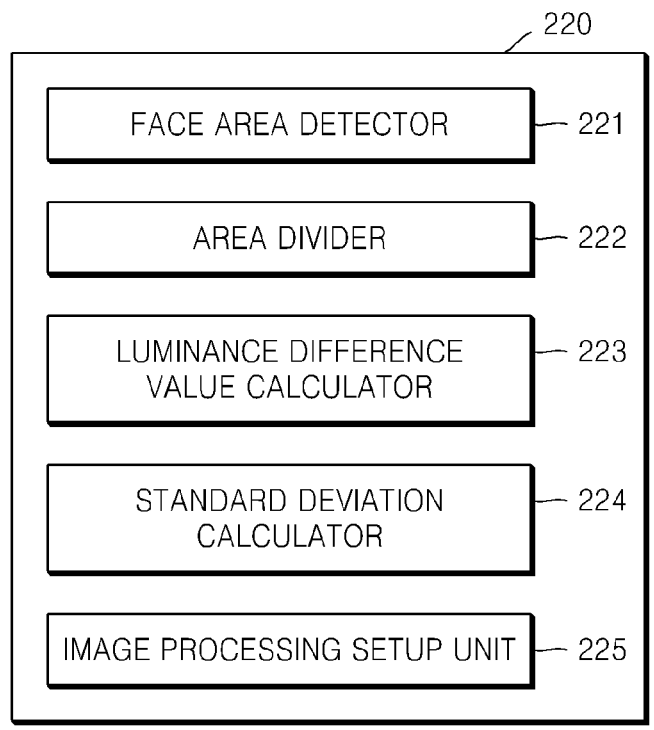
FIG. 3 is a block diagram of a setup unit shown in FIG. 2.

Referring to FIG. 3, the setup unit 220 includes a face area detector 221, an area divider 222, a luminance difference value calculator 223, a standard deviation calculator 224, and an image processing setup unit 225. Although it is described herein that the setup unit 220 includes all of the components described above, the invention is not limited thereto, and one or more of the components may not be part of the setup unit 220.

The face area detector 221 detects a first area including a face area from an input image. The face area detector 221 detects a face area from an image input through the image pickup device 115. In detail, the face area detector 221 detects an area having facial characteristics corresponding to a face, e.g., an area having a skin color, an area having an eye or eyes, or an area having a facial shape, as the face area. There are a lot of technologies regarding face area detection schemes and algorithms, and they may be used for the face detection according to an exemplary embodiment of the invention. For example, the face area may be detected by using a motion vector scheme, a feature point detection scheme, and/or a machine learning method.

The area divider 222 divides an entire area of the input image into the first area and a second area remaining by excluding the first area from the input image. Here, the first area indicates the face area, and the second area indicates an area remaining by excluding the face area from the input image.

The luminance difference value calculator 223 calculates a difference between a luminance value of the first area and a luminance value of the second area. In detail, the luminance difference value calculator 223 calculates the difference between the luminance value of the first area and the luminance value of the second area by using the luminance detected by the luminance detector 210 shown in FIG. 2.

The standard deviation calculator 224 calculates a standard deviation of luminance values of pixels existing in the first area.

The image processing setup unit 225 sets the image processing type and/or the image processing strength based on the calculated difference and the calculated standard deviation. The image processing setup unit 225 may set the image processing type and/or the image processing strength by considering the luminance difference value between the first area and the second area. For example, if the luminance difference value between the first area (face area) and the second area (non-face area) is less than 2 Light Values (LVs), the face tone processing is performed. This is to obtain a natural image by performing the face tone processing when a luminance difference between a face area and a non-face area is equal to or less than a predetermined level, since a face is shown darker than before or an image is unnatural due to saturation of the image when the face tone processing is performed in a case where the luminance difference between the face area and the non-face area is greater than the predetermined level. Here, LV denotes a unit indicating a luminance value.

The image processing setup unit 225 may also set the face retouch processing based on a standard deviation of luminance values of all pixels existing in the first area (face area). Here, the standard deviation may be determined as noise existing on a picture. For example, if a standard deviation of luminance values in a face area is large, it may be determined that a lot of blemishes and/or wrinkles exist on a face. Thus, the image processing setup unit 225 determines whether to set the face retouch processing based on the standard deviation. In addition, a strength of the face retouch processing may be set based on the standard deviation. For example, the strength of the face retouch processing may be set so that the face retouch processing is performed in the highest level, e.g., the third stage, if the standard deviation is large, e.g., equal to or greater than 250, performed in an intermediate level, e.g., the second stage, if the standard deviation is intermediate, e.g., equal to or greater than 150 and less than 250, and performed in the lowest level, e.g., the first stage, if the standard deviation is small, e.g., equal to or greater than 90 and less than 150. Here, the numerical values 250, 150, and 90 are standard deviations when photographing is performed based on International Organization for Standardization (ISO) 3200, ISO 1600, and ISO 800, respectively. Although the numerical values and the image processing strengths are limited in an exemplary embodiment of the invention, the invention is not limited thereto.

The image processing setup unit 225 may also set the image processing type based on a luminance value corresponding to a surrounding brightness. For example, an image becomes an unnatural image if the image is processed to show only a face area bright since an entire image is dark in a case where the luminance value is less than 4 LVs, an thus the image processing setup unit 225 may set only the face retouch processing by considering noise due to low intensity of light without setting the face tone processing. Here, a condition less than 4 LVs may be determined as a place, such as the indoors, with insufficient intensity of light. If the luminance value is equal to or greater than 4 LVs and less than 15 LVs, since it may be determined as a general outdoor condition or a place with sufficient intensity of light, the image processing setup unit 225 may set the face tone processing and the face retouch processing based on a luminance value of a non-face area and a standard deviation level of a face area. If the luminance value is equal to or greater than 15 LVs, since it may be determined as an open air condition with a strong sunshine, the image processing setup unit 225 may set the face tone processing based on a luminance difference and the face retouch processing based on a standard deviation by assuming that a face is captured dark due to counterlight.

The image processing setup unit 225 may also set the image processing strength based on a luminance value corresponding to a surrounding brightness. For example, strengths of the face tone processing and the face retouch processing may be set to the third stage if the luminance value is less than 4 LVs, to the second stage if the luminance value is equal to or greater than 4 LVs and less than 15 LVs, and to the first stage if the luminance value is equal to or greater than 15 LVs.

The image processing setup unit 220 displays both a result image processed according to the surrounding brightness and a result image of which an image processing strength is directly set by the user by setting an automatic image processing guide function according to a setup input of the user. See FIG. 8, which illustrates a result image 810 automatically processed according to a surrounding brightness and a result image 800 captured and processed based on settings of the user being displayed on the display together. Accordingly, the user may select a relatively natural image by comparing the two images 800 and 810.

The image processor 230 performs image processing of the input image according to the set image processing type and/or the set image processing strength. Here, the image processing type includes the face tone processing and the face retouch processing. The face tone processing means color processing in the same tone as a facial skin color, and the face retouch processing means processing to remove blemishes and wrinkles existing on a face. Although the image processing type includes the face tone processing and the face retouch processing in an exemplary embodiment of the invention, the invention is not limited thereto, and it should be understood that the image processing type includes all kinds of image processing of compensating for an image by performing the image processing of an input image so that the image shows a generally good feeling. For example, a good feeling may be shown by preventing a face having a clean skin from being blurred with a low image processing strength set in a case where a surrounding brightness of the input image is bright and by processing a face having an unclean skin to be blurred a little with a high image processing strength set in a case where the surrounding brightness of the input image is dark. Blurring, a representative example of the face retouch processing, is processing of making an arbitrary image smooth and gorgeous by removing minute parts of the arbitrary image. Here, blur processing or blurring is performed by applying a filter for averaging values of pixels, and for example, a low-pass filter or a Gaussian blur filter may be used.

Figure 4:
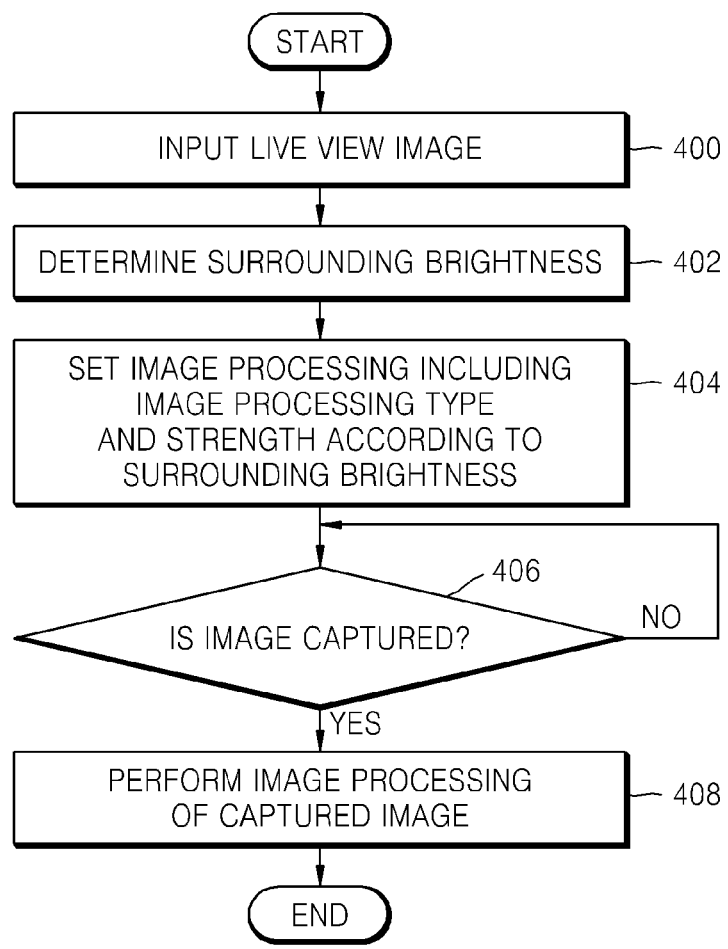
FIG. 4 is a flowchart of a method of controlling a digital photographing apparatus, according to another exemplary embodiment of the invention.

FIG. 4 is a flowchart of a method of controlling a digital photographing apparatus, according to another exemplary embodiment of the invention.

Referring to FIG. 4, in operation 400, a live view image is input. This means a state before a photographing operation of a user, i.e., before pushing a release button, and operation 400 is not limited to the input of the live view image.

In operation 402, a surrounding brightness is determined. A measurement unit for measuring the surrounding brightness may be an image sensor, a photo sensor, or a backlight unit of an LCD. The surrounding brightness through the image sensor is measured by calculating a luminance value of an entire image by calculating luminance values from mean values of accumulated values of RGB pixels accumulated by the image sensor.

In operation 404, image process including an image processing type and an image processing strength is set according to the surrounding brightness. Here, the image processing type and the image processing strength are set according to the surrounding brightness.

When an input image is captured in operation 406, the image processing set in operation 404 is performed for the captured image in operation 408.

Figure 5:
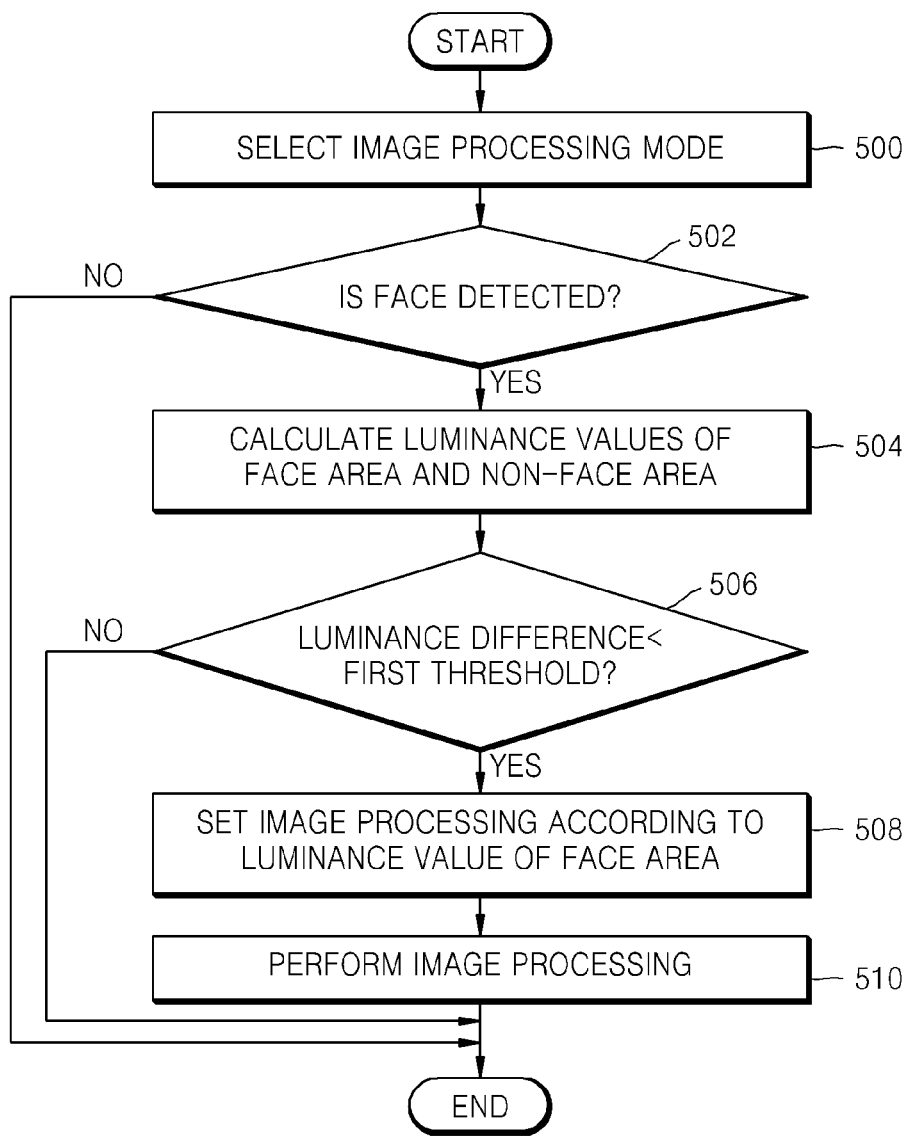
FIG. 5 is a flowchart of a method of controlling a digital photographing apparatus, according to another exemplary embodiment of the invention.

FIG. 5 is a flowchart of a method of controlling a digital photographing apparatus, according to another exemplary embodiment of the invention.

Referring to FIG. 5, in operation 500, an image processing mode is selected. Here, the image processing mode means a mode of automatically processing a captured image according to an image processing type and/or an image processing strength set according to a surrounding brightness.

In operation 502, a face area is detected from an input image. If the face area is detected, luminance values of the face area and a non-face area are calculated in operation 504. In operation 506, it is determined whether a luminance difference value is less than a first threshold. If the luminance difference value is less than the first threshold, the process proceeds to operation 508 to set image processing according to the luminance value of the face area. In operation 510, the image processing set in operation 508 is performed for the captured image.

Figure 6:
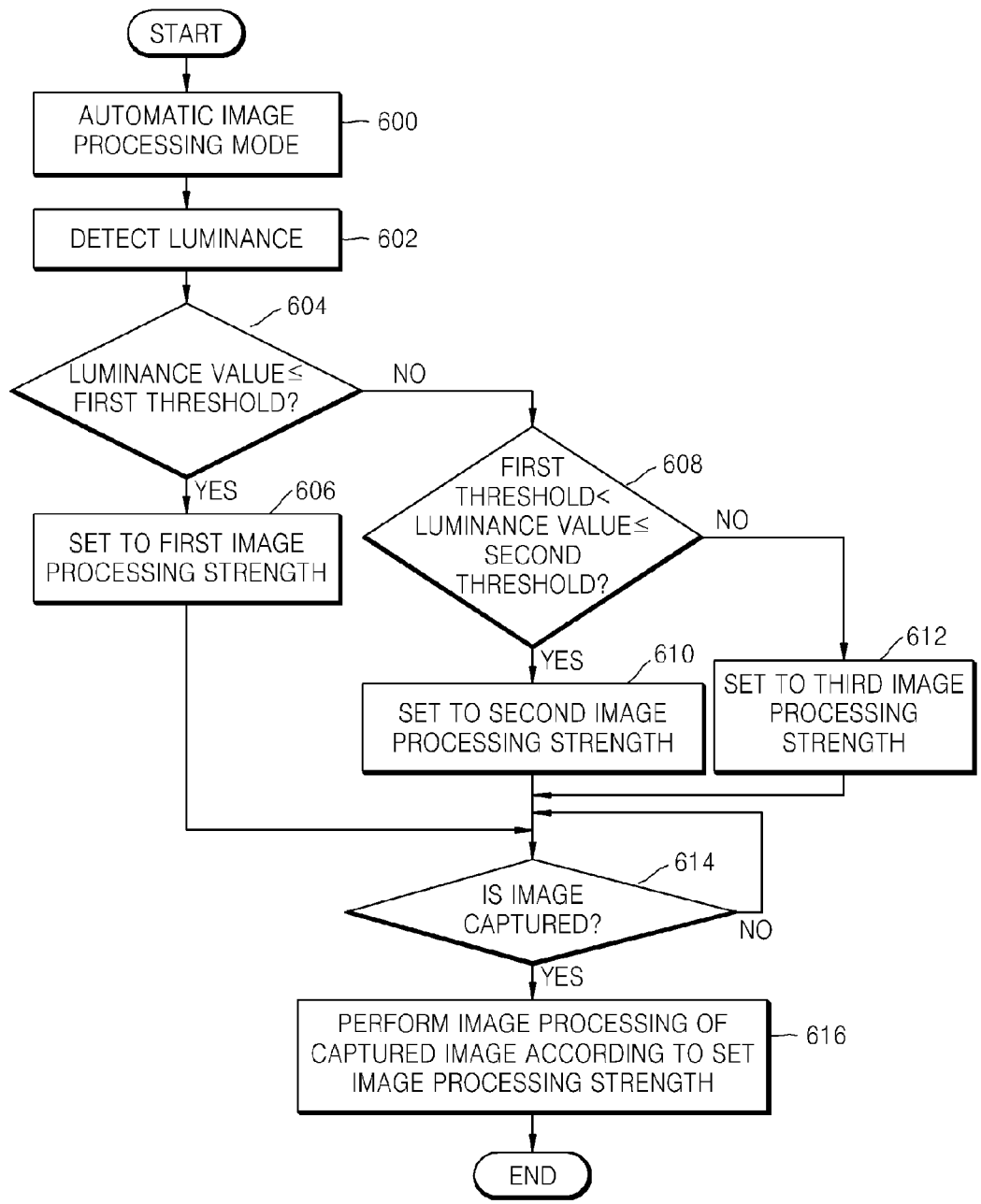
FIG. 6 is a flowchart of a method of controlling a digital photographing apparatus, according to another exemplary embodiment of the invention.

FIG. 6 is a flowchart of a method of controlling a digital photographing apparatus, according to another exemplary embodiment of the invention.

Referring to FIG. 6, in operation 600, the automatic image processing mode is selected.

In operation 602, a luminance value of an input image is detected. If it is determined in operation 602 that the luminance value is equal to or less than the first threshold, an image processing strength is set to a first image processing strength in operation 606. If it is determined in operation 608 that the luminance value is greater than the first threshold and equal to or less than a second threshold, the image processing strength is set to a second image processing strength in operation 610. If it is determined in operation 608 that the luminance value is greater than the second threshold, the image processing strength is set to a third image processing strength in operation 612.

In operation 614, an input image is captured. In operation 616, image processing of the captured image is performed with the image processing strength set in operation 606, 610, or 612.

Figure 7A:
FIGS. 7A to 7C are diagrams for describing image-processed result images, according to another exemplary embodiment of the invention.

FIG. 7A shows a result image obtained by performing image processing of the captured image when the image processing strength is set to the first image processing strength, e.g., the third stage of the face tone processing and/or the face retouch processing, set in operation 606. FIG. 7A corresponds to a case where a surrounding brightness is equal to or less than the first threshold and shows a result obtained by performing image processing with a high strength under a dark condition.

Figure 7B:
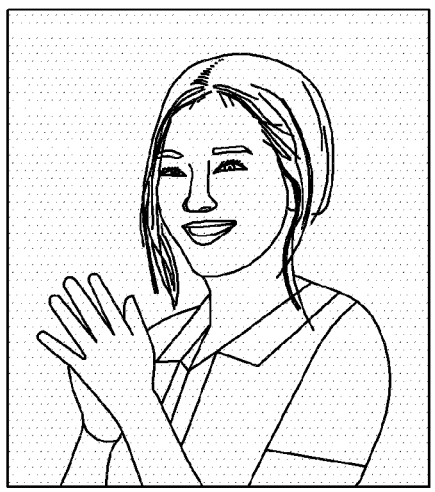

FIG. 7B shows a result image obtained by performing image processing of the captured image when the image processing strength is set to the second image processing strength, e.g., the second stage of the face tone processing and/or the face retouch processing, set in operation 608. FIG. 7B corresponds to a case where the surrounding brightness is greater than the first threshold and equal to or less than the second threshold and shows a result obtained by performing image processing with an intermediate strength under an intermediate brightness condition.

Figure 7C:
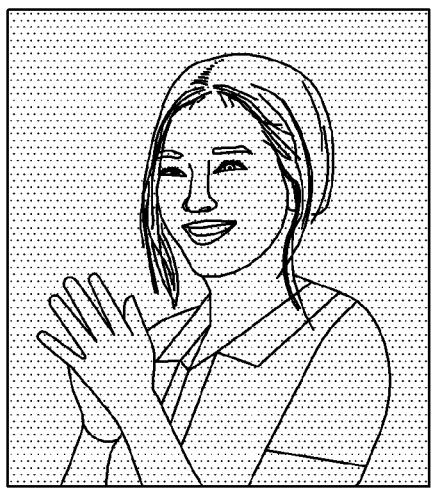

FIG. 7C shows a result image obtained by performing image processing of the captured image when the image processing strength is set to the third image processing strength, e.g., the first stage of the face tone processing and/or the face retouch processing, set in operation 612. FIG. 7C corresponds to a case where the surrounding brightness is greater than the second threshold and shows a result obtained by performing image processing with a weak strength under a bright brightness condition.

Figure 8:
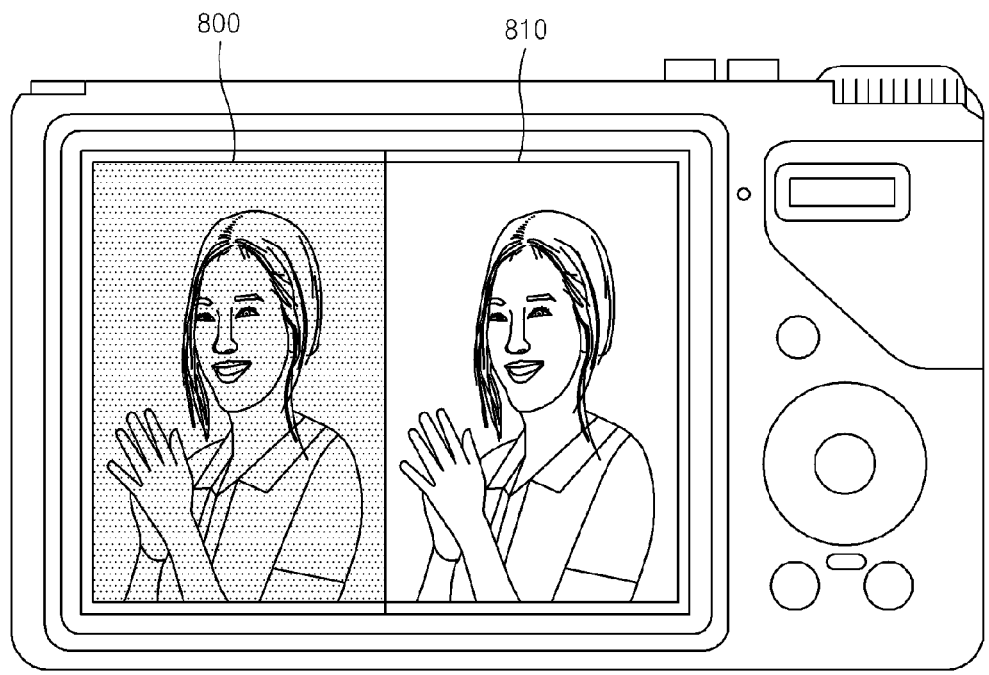
FIG. 8 is a diagram for describing image-processed result images, according to another exemplary embodiment of the invention.

FIG. 8 shows a result image 810 processed according to a surrounding brightness and a result image 800 captured and processed based on settings of the user are displayed together on the display. Displaying the images together may help the user select an image.

The invention provides a digital photographing apparatus for providing natural images fitting a surrounding environment or brightness to a user by automatically determining an image processing type and an image processing strength according to the surrounding brightness and a control method thereof.

The invention may allow various kinds of change or modification and various changes in form, and specific embodiments will be illustrated in drawings and described in detail in the specification. However, it should be understood that the specific embodiments do not limit the inventive concept to a specific disclosing form but include every modified, equivalent, or replaced one within the spirit and technical scope of the inventive concept. In the description, well-known functions or constructions are not described in detail since they would obscure the invention with unnecessary detail.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the inventive concept. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

An apparatus according to the invention may include a processor, a memory for storing and executing program data, a permanent storage such as a disk drive, a communication port for performing communication with an external device, and a user interface, such as a touch panel, a key, and a button. Methods implemented with a software module or an algorithm may be stored in a computer readable recording medium in the form of computer readable codes or program instructions executable in the processor. Examples of the computer readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer readable recording medium can also be distributed over network coupled computer systems so that the computer readable code is stored and executed in a distributed fashion. The media can be read by a computer, stored in the memory, and executed by the processor.

All cited references including publicized documents, patent applications, and patents cited in the invention can be merged in the invention in the same manner as the shown by individually and concretely merging each cited reference and the shown by generally merging each cited reference in the invention.

For the understanding of the invention, reference numerals are disclosed in the exemplary embodiments shown in the drawings, and specific terms are used to describe the exemplary embodiments of the invention. However, the invention is not limited by the specific terms, and the invention may include all components, which can be commonly thought by those of ordinary skill in the art. The invention can be represented with functional blocks and various processing steps. These functional blocks can be implemented by various numbers of hardware and/or software configurations for executing specific functions. For example, the invention may adopt direct circuit configurations, such as memory, processing, logic, and look-up table, for executing various functions under a control of one or more processors or by other control devices. Like that the components of the invention can execute the various functions with software programming or software elements, the invention can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the invention may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the invention are exemplary embodiments and do not limit the scope of the invention even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete mention, such as "requisite" or "important", it may not be a necessarily required component for application of the invention.

The use of the term "said" or a similar directional term in the specification (in particular, in claims) of the invention may correspond to both the singular and the plural. In addition, when a range is disclosed in the invention, inventions to which individual values belonging to the range are applied are included (if there is no disclosure opposed to this), and this is the same as that each of the individual values forming the range is disclosed in the detailed description of the invention. Finally, for steps forming the methods according to the invention, if an order is not clearly disclosed or, if there is no disclosure opposed to the clear order, the steps can be performed in a proper order. The invention is not necessarily limited to the disclosed order of the steps. The use of all illustrations or illustrative terms (for example, and so forth, etc.) in the invention is simply to describe the invention in detail, and the scope of the invention is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

What is claimed is:

1. A method of controlling a digital photographing apparatus, the method comprising:
- measuring surrounding brightness of the digital photographing apparatus;
- setting at least one of an image processing type and an image processing strength according to the measured surrounding brightness; and
- performing image processing of an input image according to at least one of the set image processing type and the set image processing strength,
- wherein the setting comprises:
- detecting a first area comprising a face area from the input image;
- dividing an entire area of the input image into the detected first area and a second area remaining by excluding the first area from the input image;
- calculating a difference between a luminance value of the first area and a luminance value of the second area, wherein the difference is calculated by using the measured surrounding brightness; and
- if the difference is less than a first threshold, setting at least one of first image processing comprising face tone processing of the first area and a strength of the first image processing.

2. The method of claim 1, wherein the measuring of the surrounding brightness comprises measuring the surrounding brightness by calculating a luminance value of an input image captured by an image sensor of the digital photographing apparatus.

3. The method of claim 1, wherein the measuring of the surrounding brightness comprises measuring the surrounding brightness through a photo sensor of the digital photographing apparatus.

4. The method of claim 1, wherein the measuring of the surrounding brightness comprises measuring the surrounding brightness through a Liquid Crystal Display (LCD) backlight unit of the digital photographing apparatus.

5. The method of claim 1, wherein the setting comprises variously setting the image processing strength according to a luminance value of the surrounding brightness.

6. The method of claim 1,
- wherein the face tone processing shows a facial skin color shown too dark as an actual skin color through color processing.

7. The method of claim 1, wherein the setting further comprises:
- calculating a standard deviation of luminance values of pixels existing in the first area, which corresponds to the measured surrounding brightness; and
- setting at least one of second image processing comprising face retouch processing of the first area according to the calculated standard deviation and a strength of the second image processing,
- wherein the face retouch processing removes blemishes and wrinkles existing on a face.

8. The method of claim 1, wherein the setting further comprises:
- calculating a standard deviation of luminance values of pixels existing in the first area, which corresponds to the measured surrounding brightness; and
- setting at least one of the image processing type and the image processing strength based on the calculated difference and the calculated standard deviation.

9. The method of claim 1, wherein the setting comprises:
- dividing an input image captured by an image sensor into N unit areas (N is a positive integer of 1 or more);
- calculating mean values of a plurality of R pixels, a plurality of G pixels, and plurality of B pixels in a unit area;
- calculating a luminance value of the unit area by using the mean values; and
- calculating a luminance value according to the surrounding brightness by summing luminance values of the N unit areas and dividing the summed luminance value by N.

10. The method of claim 1, wherein the setting comprises setting the image processing strength as a first image processing strength if a luminance value according to the measured surrounding brightness is less than a first threshold,
- setting the image processing strength as a second image processing strength if the luminance value is equal to or greater than the first threshold and less than a second threshold, and
- setting the image processing strength as a third image processing strength if the luminance value is equal to or greater than the second threshold.

11. The method of claim 1, further comprising displaying an image processed according to at least one of the set image processing type and the set image processing strength on a first area of a display screen of the digital photographing apparatus.

12. The method of claim 11 further comprising displaying an image processed according to a user image processing setup on a second area of the display screen.

13. A non-transitory computer program product, comprising a computer usable medium having a computer readable program code embodied therein, said computer readable program code adapted to be executed to implement the method of claim 1.

14. A digital photographing apparatus comprising:
- a measurement unit configured to measure surrounding brightness;
- a luminance detector configured to detect a luminance corresponding to the measured surrounding brightness; and
- a digital signal processor configured to set at least one of an image processing type and an image processing strength according to the measured surrounding brightness and to perform image processing of an input image according to at least one of the set image processing type and the set image processing strength,
- wherein the digital signal processor comprises:
- a face area detector configured to detect a first area comprising a face area from the input image;
- an area divider configured to divide an entire area of the input image into the detected first area and a second area remaining by excluding the first area from the input image;
- a luminance difference value calculator configured to calculate a difference between a luminance value of the first area and a luminance value of the second area, wherein the difference is calculated by using the measured surrounding brightness; and
- an image processing setup unit configured to set at least one of first image processing comprising face tone processing of the first area and a strength of the first image processing if the difference is less than a first threshold.

15. The digital photographing apparatus of claim 14, wherein the measurement unit comprises an image sensor; and the luminance detector divides an input image captured by the image sensor into N unit areas (N is a positive integer of 1 or more), calculates mean values of a plurality of R pixels, a plurality of G pixels, and plurality of B pixels in a unit area, calculates a luminance value of the unit area by using the mean values, and calculates a luminance value according to the surrounding brightness by summing luminance values of the N unit areas and dividing the summed luminance value by N.

16. The digital photographing apparatus of claim 14, wherein the digital signal processor comprises:

a setup unit configured to receive input to set at least one of the image processing type and the image processing strength according to the luminance value of the surrounding brightness; and an image processor configured to perform image processing of the input image according to at least one of the set image processing type and the set image processing strength.

17. The digital photographing apparatus of claim 14, wherein the face tone processing shows a facial skin color shown too dark as an actual skin color through color processing.

18. The digital photographing apparatus of claim 14, wherein the digital signal processor comprises:

a standard deviation calculator configured to calculate a standard deviation of luminance values of pixels existing in the first area, which corresponds to the measured surrounding brightness; and an image processing setup unit configured to set at least one of second image processing comprising face retouch processing of the first area according to the calculated standard deviation, or a strength of the second image processing, wherein the face retouch processing removes blemishes and wrinkles existing on a face.

19. The digital photographing apparatus of claim 14, wherein the digital signal processor further comprises:

a standard deviation calculator configured to calculate a standard deviation of luminance values of pixels existing in the first area, which corresponds to the measured surrounding brightness; and an image processing setup unit configured to set at least one of the image processing type and the image processing strength based on the calculated difference and the calculated standard deviation.

20. The digital photographing apparatus of claim 14, wherein the digital signal processor is configured to set the image processing strength as a first image processing strength if a luminance value according to the measured surrounding brightness is less than the first threshold, to set the image processing strength as a second image processing strength if the luminance value is equal to or greater than the first threshold and less than a second threshold, and to set the image processing strength as a third image processing strength if the luminance value is equal to or greater than the second threshold.

* * * * *